United States Patent
Yang et al.

(10) Patent No.: US 7,388,727 B1
(45) Date of Patent: Jun. 17, 2008

(54) METHOD AND APPARATUS FOR MOVING OFF OF A DISK DRIVE'S CRASH STOP IN A CONSISTENT MANNER

(75) Inventors: Xin Hua Yang, Fremont, CA (US); Lin Guo, Saratoga, CA (US); Yu Sun, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 40 days.

(21) Appl. No.: 11/636,416

(22) Filed: Dec. 7, 2006

Related U.S. Application Data

(63) Continuation of application No. 11/508,126, filed on Aug. 21, 2006.

(60) Provisional application No. 60/709,584, filed on Aug. 19, 2005.

(51) Int. Cl.
*G11B 21/02* (2006.01)

(52) U.S. Cl. .................................................... 360/75
(58) Field of Classification Search .................. 360/75, 360/78.04, 77.02
See application file for complete search history.

(56) References Cited

U.S. PATENT DOCUMENTS

| 6,061,198 | A   | * | 5/2000 | Shrinkle ............... 360/75 |
| 6,239,935 | B1  | * | 5/2001 | Shrinkle ............... 360/75 |
| 6,762,899 | B2  | * | 7/2004 | Ottesen et al. ........ 360/75 |
| 6,785,079 | B2  | * | 8/2004 | Brannon et al. ....... 360/75 |
| 7,268,965 | B2  | * | 9/2007 | Brannon et al. ....... 360/75 |
| 2007/0291401 | A1 | * | 12/2007 | Sun et al. ............ 360/75 |

* cited by examiner

*Primary Examiner*—Fred Tzeng
(74) *Attorney, Agent, or Firm*—David K. Lucente

(57) ABSTRACT

The present invention is directed to a method and apparatus for moving off of a disk drive's crash stop in a consistent manner.

1 Claim, 3 Drawing Sheets

Smooth VCM DAC (control) signal achieved by proposed method vs. no zero velocity control when moving off crash stop.

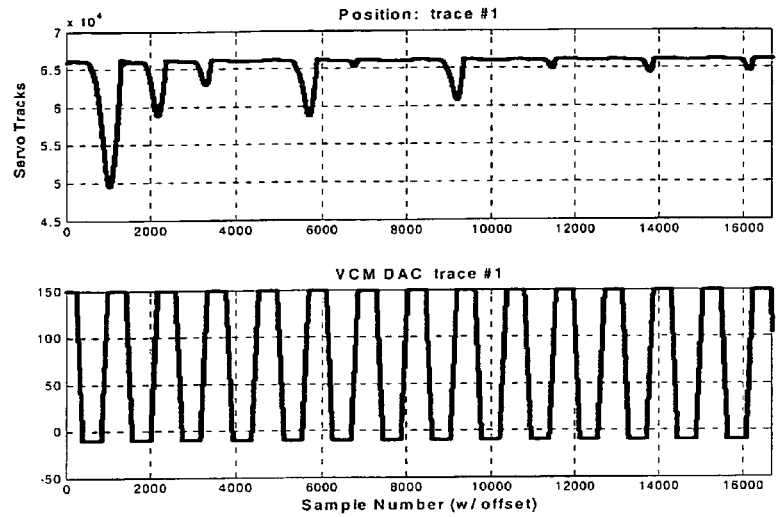
Figure (1): VCM motion when moving off crash stop under Open-Loop control. VCM stays on crash stop for 420 number of sample time (68 uSec.).
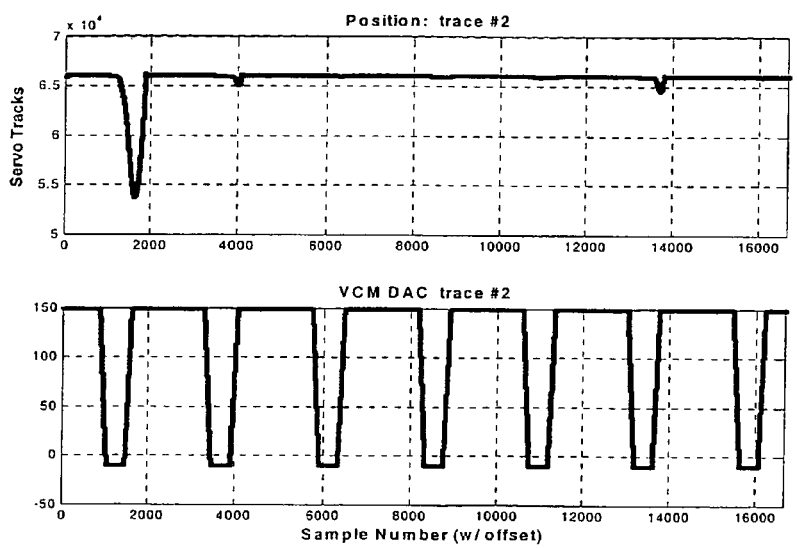
Figure (2): VCM motion when moving off crash stop under Open-Loop control. VCM stays on crash stop for 1680 number of sample time(68 uSec.).

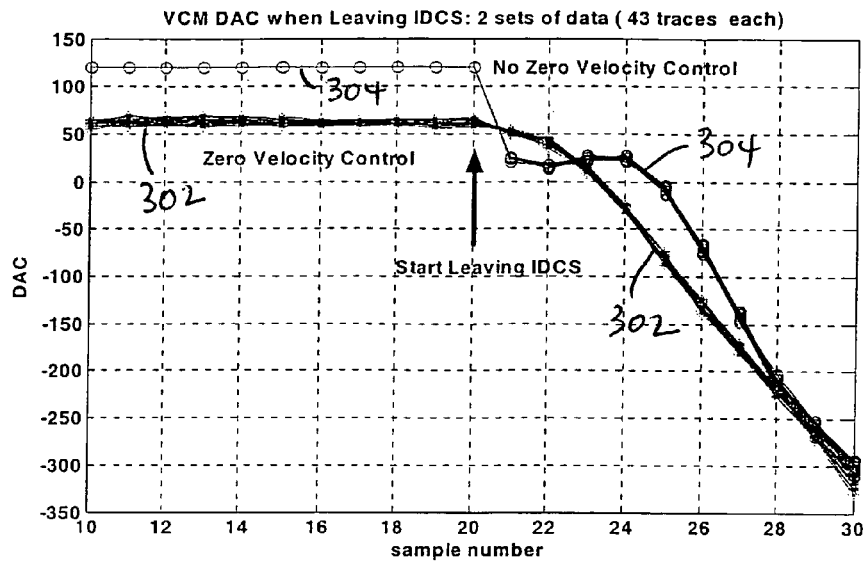
Figure (3): Smooth VCM DAC (control) signal achieved by proposed method vs. no zero velocity control when moving off crash stop.
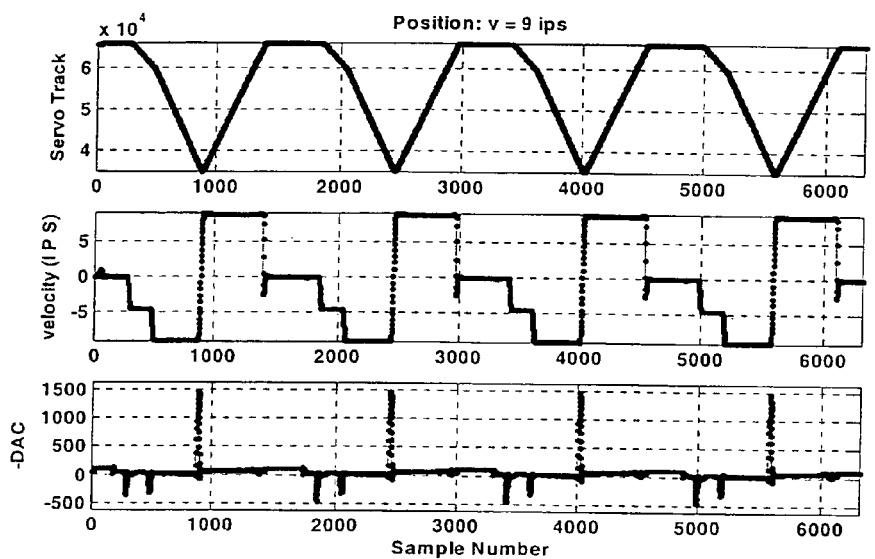
Figure (4) Measured VCM position signal, VCM velocity (under zero velocity control on crash stop), and VCM DAC (control) signal (positive side of signal corresponds to the direction towards crash stop at ID of disk.)

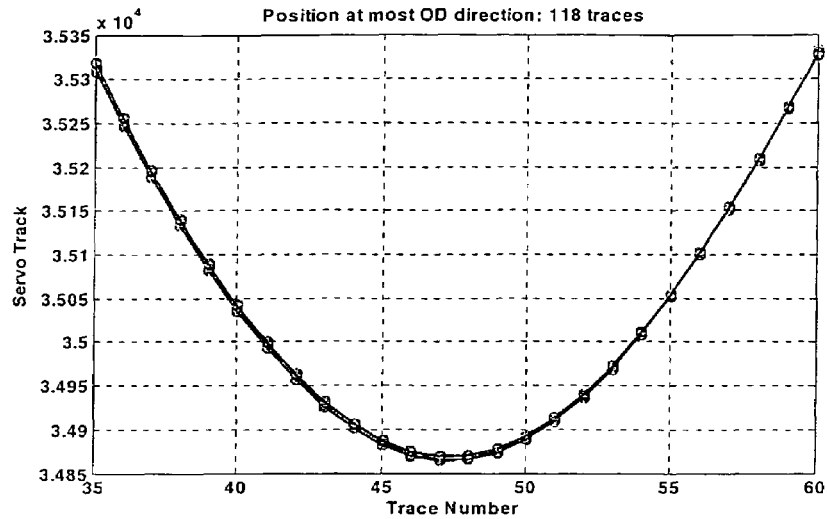
Figure (5). Measured VCM (zoomed in) position signal of 118 tries moving away from crash stop (i.e. towards OD direction in this case)
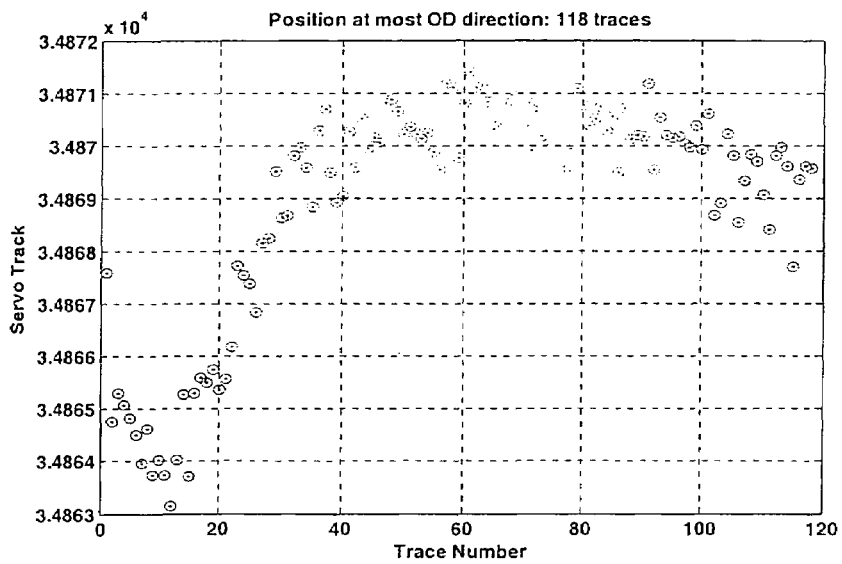
Figure (6). VCM position at most OD direction (tip of dip in Figure (5)). The position variation after 100 tries lie within +/- 1.5 servo track range.

METHOD AND APPARATUS FOR MOVING OFF OF A DISK DRIVE'S CRASH STOP IN A CONSISTENT MANNER

CROSS-REFERENCE TO RELATED APPLICATION

This is a continuation of U.S. patent application Ser. No. 11/508,126 filed Aug. 21, 2006, which claims priority from U.S. Provisional Application Ser. No. 60/709,584 filed Aug. 19, 2005, both of which are incorporated herein by reference in their entireties.

FIELD OF THE INVENTION

The present invention relates generally to data storage devices, such as hard disk drives. More particularly, the present invention relates to a method and apparatus for moving off of a disk drive's crash stop in a consistent manner.

BRIEF DESCRIPTION OF THE DRAWINGS

FIG. 1 shows a plot graphically depicting a first set of DAC commands and resulting actuator motion over a number of attempts to remove an actuator from a crash stop.

FIG. 2 shows a plot graphically depicting a second set of DAC commands and actuator motion over a number of attempts to remove an actuator from a crash stop.

FIG. 3 shows a plot graphically depicting DAC magnitude with and without zero velocity control over a number of attempts to remove an actuator from a crash stop.

FIG. 4 shows a plot graphically depicting DAC commands and resulting actuator position and velocity over a number of attempts to remove an actuator from a crash stop.

FIG. 5 shows a plot graphically depicting measured VCM position signal over a number of attempts to remove an actuator from a crash stop.

FIG. 6 shows a plot graphically depicting measured VCM position signal over a number of attempts to remove an actuator from a crash stop.

DESCRIPTION

One purpose of the invention is to achieve consistent motion of the VCM during and after leaving crash stop with a smooth VCM DAC control signal, when there is not any information written on the hard disk media.

Test datum have shown that, with this method, consistent motion (in terms of velocity and position of the VCM over the blank disk during and after leaving crash stop) has been achieved when compared with an open-loop method, which causes significant uncertainty in the motion during and after leaving crash stop.

The present invention proposes a method to control the VCM actuator in a hard disk drive before any information is written on the media via closed loop velocity control, when velocity signal is available via any method (e.g., back EMF or optical device, etc).

In hard disk drive, before any information is written down to the magnetic media (or disk), a crash stop can be used as a reference for the head position relative to the disk. One possible method of writing an initial position signal on the disk is to launch the VCM off from crash stop, then start writing pattern of interest.

However, due to the fact that the crash stop is made of an elastic material, it yields to the pressure by VCM. The contact surface between the crash stop and the VCM tends to "hold" the VCM when the VCM leaves crash stop. The nature of this "sticky" force is random and unpredictable, making the VCM motion after leaving crash stop very inconsistent when the VCM is under open-loop control mode.

FIG. 1, which includes test results, illustrates the problem in detail. The top plot is the recorded position of VCM: starting resting on crash stop around 660K servo tracks, and then moving off crash stop towards the position indicated by the smaller servo track number. The bottom plot is the recorded DAC command applied to the VCM. It is obvious that there were 14 VCM DAC control attempts to launch the VCM off from the crash stop, but there was only one full motion completed, with a few attempts that only barely left crash stop without going to the desired position below 550K servo tracks.

The test results in FIG. 2 show that, as the time when the VCM stays on crash stop becomes longer, the effect of the force due to stickiness becomes even stronger. In FIG. 2, the VCM DAC control magnitude is the same as in the case in FIG. 1, except that the VCM stays on the crash stop four times longer than in FIG. 1. Thus, it is clear that there is a significant inconsistency in VCM motion under open-loop control when launched from crash stop.

To achieve consistent motion when launching the VCM off from the crash stop, the following approach has been proposed, coded, and tested on Maxtor STW #82. The present invention utilizes the velocity control of the VCM when it is in contact with the crash stop and during its motion when launched off from the crash stop. The starting point is that after the VCM is pushed against crash stop (under open-loop control, go to step 1; otherwise, if under closed-loop control, go to step 2 directly).

Step 1: Switch VCM open-loop control to closed-loop velocity on VCM, with VCM velocity set to zero since VCM is sitting on crash stop. This change of control mode may cause a transient in control effort. If the open-loop control effort does not match the closed-loop control, there may be a transient motion in very small scale. But due to the fact that the VCM is pushed against the elastic crash stop under zero velocity control after switch, the VCM will not leave crash stop under the zero velocity control effort. If there is still concern that the VCM might have moved off the crash stop, one can start with a velocity which pushes the VCM slightly into crash stop even more, and then smoothly change the velocity to zero.

Step 2: Keep the VCM under zero velocity control until it is time to move the VCM off the crash stop.

Step 3: Move the VCM off crash stop under closed-loop velocity control, following a predefined smooth velocity transition profile (e.g., a sinusoidal curve), with velocity starting from zero and ending at a desired target velocity.

In hard disk drive VCM motion control during a servo write process, it is vital to lay down a position reference signal on the magnetic media (or disk). To achieve this, the motion of the head, which writes the signal, should be under precise motion control. Yet, the vibration of the suspension of the VCM arm has an adverse effect on the position signal written on the media. One important source of exciting the vibration is from the jerk in the VCM actuator control signal. As shown in the plots of test results in FIG. 3, the VCM DAC (control) signal of the present invention (302) is smooth compared with the control signal (304) of the other method tried by the inventors, which has a sudden jump. Also shown in the plots are a smooth transition of the VCM velocity from zero to a given target velocity, hence avoiding excitation of vibration of the VCM arm/suspension.

What is claimed is:

1. A method comprising the steps of:

providing a disk drive having a disk surface, an actuator arm, a crash stop for limiting movement of the actuator arm and a VCM for moving the actuator arm relative to the disk surface;

positioning the actuator arm against the crash stop;

moving the actuator arm away from the crash stop in a closed-loop fashion, wherein the disk surface has no servo information written thereon.

* * * * *